US005337993A

United States Patent [19]

Hersman

[11] Patent Number: 5,337,993

[45] Date of Patent: Aug. 16, 1994

[54] STAKE-BASED SUPPORT SYSTEM FOR USE IN THE LANDSCAPING INDUSTRY

[76] Inventor: Michael J. Hersman, 10909A SW. 113th Pl., Miami, Fla. 33176

[21] Appl. No.: 869,550

[22] Filed: Apr. 15, 1992

[51] Int. Cl.[5] .......... F16M 11/00

[52] U.S. Cl. .......... 248/156; 248/906; 248/76; 362/431

[58] Field of Search .......... 248/156, 76, 85, 87, 248/530, 532, 533, 545, 906; 52/169.1; 47/42, 43, 44; 362/805, 431, 450, 414, 191

[56] References Cited

U.S. PATENT DOCUMENTS

| | | | |
|---|---|---|---|
| 134,828 | 1/1873 | Watson . | |
| 396,624 | 1/1889 | Thomas . | |
| 492,520 | 2/1893 | Hedges . | |
| 1,161,303 | 11/1915 | Fritz . | |
| 1,333,842 | 3/1920 | Durkee . | |
| 1,591,845 | 2/1926 | Kurtz . | |
| 1,715,801 | 5/1929 | White . | |
| 1,779,867 | 10/1930 | Ahrold | 248/156 X |
| 2,554,887 | 5/1951 | Tricarico . | |
| 2,679,996 | 6/1954 | Rowe et al. | 248/156 X |
| 2,846,189 | 8/1958 | MacLaughlin | 248/76 X |
| 3,545,839 | 12/1970 | Hadley | 248/156 X |
| 3,684,224 | 8/1972 | Kwako | 248/87 |
| 3,805,055 | 4/1974 | Cassey | 362/431 X |
| 4,201,975 | 5/1980 | Marcus | 248/519 X |
| 4,523,263 | 6/1985 | Poyer | 362/431 X |
| 4,996,636 | 2/1991 | Lovett | 362/431 |
| 5,036,447 | 7/1991 | Taylor | 362/431 |
| 5,065,975 | 11/1991 | Giles | 248/156 X |

FOREIGN PATENT DOCUMENTS

| | | | |
|---|---|---|---|
| 2439079 | 10/1977 | Fed. Rep. of Germany | 248/156 |
| 1325746 | 3/1963 | France | 362/805 |
| 1557852 | 2/1969 | France | 248/530 |
| 797291 | 7/1958 | United Kingdom | 362/805 |

OTHER PUBLICATIONS

After Sunset TM Low Voltage Landscape Lighting Planning and Installation Guide, Aug. 1990, p. 5.

Kichler Landscape Lighting catalog, 1991, p. 18 and attached instruction sheet.

Hanover Lantern, Terralight group, Catalog No. TG87, date unknown.

Hanover Lantern, Lightscape group, brochure, date unknown.

RAB Electric Manufacturing Co., Inc. Outdoor Lighting Catalog, 1989, pp. 14-15.

*Primary Examiner*—Karen J. Chotkowski

*Attorney, Agent, or Firm*—Leslie J. Lott & Assoc.

[57] ABSTRACT

A stake-based support system for use in the landscaping industry. The system includes a spiked section having a pair of elongated legs with pointed spikes on their bottom ends and a footed section having a pair of L-shaped legs with foot sections for supporting the system. The pairs of legs are linked by connecting strips and the two sections are attached to each other by a threaded pipe, nuts, and washers. The system includes means for receiving a landscaping device, such as a lighting fixture, a water sprinkler, a flagpole, or any other devices utilized in the landscaping industry.

6 Claims, 3 Drawing Sheets

STAKE-BASED SUPPORT SYSTEM FOR USE IN THE LANDSCAPING INDUSTRY

TECHNICAL FIELD

This invention relates generally to an improved system for supporting ground-driven structures used in the landscaping industry, and this invention specifically relates to an improved stake-based support system for supporting ground-driven structures used in the landscaping industry.

BACKGROUND OF THE INVENTION

In the landscaping industry, decorative lighting fixtures are among the devices utilized to improve the appearance of a particular landscape, while simultaneously providing the safety and security associated with a lighted area. Currently, decorative lighting fixtures are manufactured such that the fixture is attached to a stake having a pointed edge opposite the fixture. The fixture is positioned by driving the pointed edge of the stake into the ground to a desired depth, leaving the fixture above the ground in its desired position. For example, a series of lighting fixtures may be lined up along the opposite sides of a sidewalk leading from the driveway to the front door of a residence. In order to create a so-called staircase effect, each lighting fixture may be attached to an intermediate extender of varying length, with the extender in turn being attached to the stake, creating the appearance that each subsequent lighting fixture is "shorter" than the preceding fixture.

Among the manufactures of stake-supported landscaping lighting fixtures are Hanover Lantern, 470 High Street, Hanover, Pa., 17331; After Sunset, 410 West Fletcher Avenue, Orange, Calif., 92665; Kichler Lighting, 1541 E. 38th Street, Cleveland, Ohio, 44114; and RAB Electric Manufacturing Co., Inc., 170 Ludlow Avenue, Northvale, N.J., 07647. Many stake-supported lighting fixtures manufactured by these companies feature exposed power supplies. The power supplies, usually a long cord linking the fixture with a central power source, are connected to the lighting fixtures and some are exposed between the fixture and the point where the stake enters the ground, where the power supplies are usually buried.

A potential problem associated with the fixtures described above and manufactured by the referenced companies is that the stake is subject to being toppled over while, for example, the fixture is undergoing maintenance, the landscape surrounding the fixture is being maintained, or the fixture is exposed to inclement weather, particularly rainy weather which loosens the soil into which the stake is driven and/or windy weather which can uproot the stake from the ground. Furthermore, the exposure of a portion of the power supplies presents a potential danger, both because of the potential exposure of the electricity traveling through the power supply and because of the possibility of children and/or pets becoming entangled in or among the exposed cords.

There exist in the art a number of devices which are intended to prevent stakes from toppling over. Among such devices are those described in U.S. Pat. No. 134,828, to Watson; U.S. Pat. No. 396,624, to Thomas; U.S. Pat. No. 492,250, to Hedges; U.S. Pat. No. 1,161,303, to Fritz; U.S. Pat. No. 1,333,842, to Durkee; U.S. Pat. No. 1,591,845, to Kurtz; U.S. Pat. No. 1,712,801, to White; U.S. Pat. No. 2,554,887, to Tricarico; and German Patent No. 2539079, to Kosel, all of which are incorporated herein by reference. The support devices described in these patents all either directly abut the ground or result in the supported fixture directly abutting the ground. Furthermore, these devices do not provide a method for concealing the exposed power supply.

Thus, there is a need in the art for a system which prevents a stake-supported lighting fixture from toppling over while either the fixture or the landscape surrounding the fixture are being maintained or are exposed to inclement weather conditions.

There is an additional need in the art for such a system to fulfill this need while simultaneously providing a means by which to prevent exposure of the lighting fixture's power supply.

There is an additional need in the art for such a system to provide an area for accessing the lighting fixture, for maintenance or other purposes, without requiring removal of the stakes from the ground.

Furthermore, there is room in the art for a stake-based support system which may support landscaping devices other than lighting fixtures.

SUMMARY OF THE INVENTION

The present invention fulfills the need in the art.

Broadly described, the present invention provides a stake-based elevated support system for a landscaping device having a connecting source.

In a preferred embodiment of the present invention, the support system comprises a substantially U-shaped spiked section comprising a pair of elongated legs linked to each other by a first connecting strip attached to a top end of each of the elongated legs such that the elongated legs are substantially parallel to one another, the elongated legs having a pointed spike at a bottom end opposite the top end for securing the spiked section into a substructure; a footed section comprising a pair of substantially L-shaped legs linked to each other by a second connecting strip attached to a top end of each of the L-shaped legs, each L-shaped leg comprising a leg portion and a foot portion attached such that the foot portion extends outwardly from the leg portion in a substantially perpendicular direction, the footed section further securing the spiked section in an elevated position to provide an open area above the substructure for housing the connecting source of the landscaping device; and a pipe inserted through a hole in each of the connecting strips, attaching the spiked section to the footed section in a crossed relation with the elongated legs of the spiked section and the L-shaped legs of the footed section extending downward, whereby the pipe defines a passageway through the connecting strips for passage of the connecting source of the landscaping device, the pipe further comprising a threaded portion at a top end of the pipe for receiving and securing the landscaping device, whereby the landscaping device is threaded into the top end of the pipe, and whereby the connecting source of the landscaping device extends downward through the passageway into the open area above the substructure.

In the preferred embodiment of the present invention, the elongated legs and the L-shaped legs define the perimeter of a junction box area in which an electrical junction box may be installed for supplying power to the lighting fixture.

In the preferred embodiment of the present invention, the support system further comprises means for permanently securing the spiked section.

In an alternative embodiment of the present invention, the landscaping device is a water sprinkler.

In an alternative embodiment of the present invention, the elongated legs and the L-shaped legs define the perimeter of a sprinkler connection area for supplying water to the water sprinkler.

Accordingly, it is an object of the present invention to provide a stake-based support system for use in the landscaping industry.

It is another object of the present invention to provide a stake-based support system which prevents a stake-supported landscaping device from toppling over as a result of maintenance of either the device or the landscape surrounding the device or exposure to inclement weather.

It is another object of the present invention to provide a stake-based support system which provides a means for concealing the electrical power supply to a landscape lighting fixture.

It is another object of the present invention to provide a stake-based support system which provides an area for accessing the landscaping device without requiring removal of the stakes from the ground.

It is another object of the present invention to provide a stake-based support system which may be used with landscaping devices other than lighting fixtures.

These and other objects, features, and advantages of the present invention may be more clearly understood and appreciated from a review of the following detailed description of the disclosed embodiment and by reference to the appended drawings and claims.

BRIEF DESCRIPTION OF THE DRAWING FIGURES

DETAILED DESCRIPTION OF THE PREFERRED EMBODIMENT

Figure 1:
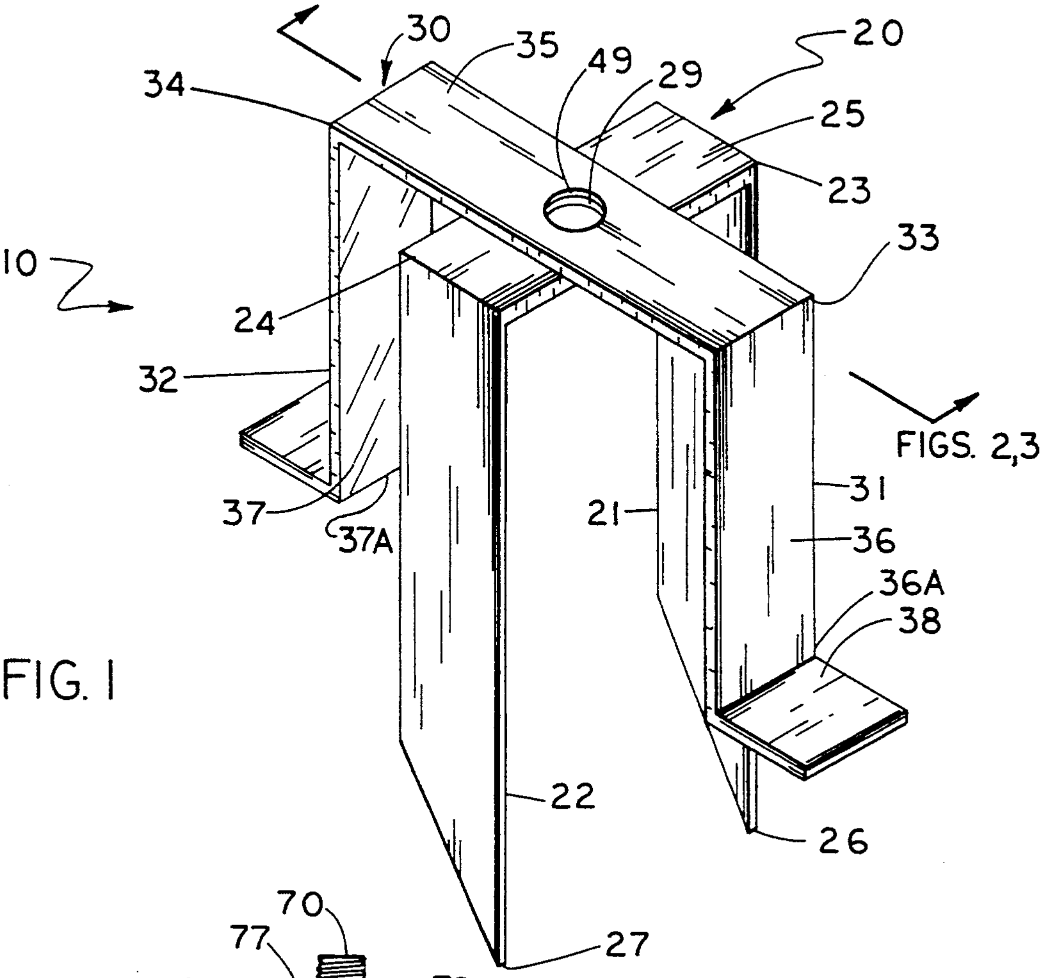
FIG. 1 is a perspective view of the preferred embodiment of the present invention prior to attachment of the spiked section to the footed section.

Referring now to the drawings, in which like numerals indicate like elements throughout the several views, FIG. 1 is a perspective view of the preferred embodiment of the stake-based support system 10, prior to attachment of the spiked section 20 to the footed section 30.

The spiked section 20 includes a pair of elongated legs 21, 22. The elongated legs 21, 22 each have a pointed spike 26, 27 at their bottom end and the elongated legs 21, 22 are linked by a first connecting strip 25 which is attached to a top end 23, 24 of each elongated leg 21, 22. The elongated legs 21, 22 are substantially parallel to one another. The spiked section 20 also includes a hole 29, located along the length of the first connecting strip 25, for receiving the threaded pipe 70, illustrated in FIG. 2, which is used to secure the spiked section 20 to the footed section 30.

Figure 2:
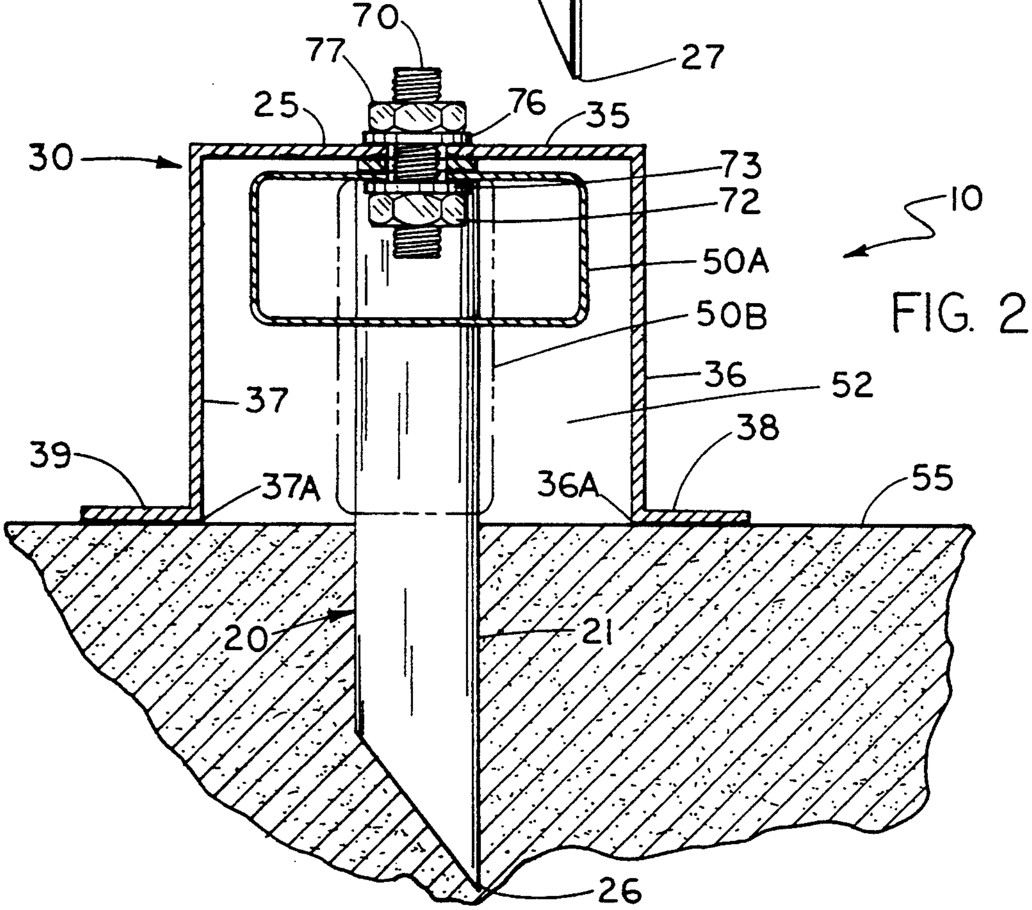
FIG. 2 is a cross-sectional pictorial view of the preferred embodiment of the present invention, without a landscape device attached thereto.

The footed section 30 includes a pair of L-shaped legs 31, 32. The L-shaped legs 31, 32 are linked by a second connecting strip 35 which is attached to a top end 33, 34 of each L-shaped leg 31, 32. As best illustrated in FIG. 2, the L-shaped legs 31, 32 each include a leg section 36, 37 and a foot section 38, 39. The foot sections 38, 39 are attached to a bottom end ***36a*, *37a* of the leg sections 36, 37 and extend outwardly from the leg sections 36, 37 in a substantially perpendicular direction. The footed section 30 also includes a hole 49, located along the length of the second connecting strip 35, for receiving the threaded pipe 70, illustrated in FIG. 2, which is used to secure the spiked section 20 to the footed section 30**.

FIG. 2 is a cross-sectional pictorial view of the stake-based support system 10, prior to attachment of a landscape device thereto. The spiked section 20 is driven into the ground 55 by driving the pointed spikes 26, 27 of the elongated legs 21, 22 into the ground 55. The pointed spikes 26, 27 are driven into the ground until the foot sections 38, 39 of the footed sections 30 abut the surface of the ground 55. The area defined by the positioning of the two elongated legs 21, 22 and the two L-shaped legs 31, 32, and bounded on the top by the connecting strips 25, 35 and on the bottom by the ground 55, forms a junction box area 52. The junction box area 52 provides space for placement of an electrical junction box ***50a*, *50b*, which allows for concealment of the power supply and electrical connection to a lighting fixture 90, shown in FIG. 3**.

The spiked section 20 is attached to the footed section 30 by insertion of a threaded pipe 70 through the two holes 29, 49 in the connecting strips 25, 35. The threaded pipe 70 is secured by tightening a first nut 72 and a first washer 73 against the first connecting strip 25 and a second nut 77 and a second washer 76 against the second connecting strip 35.

Figure 3:
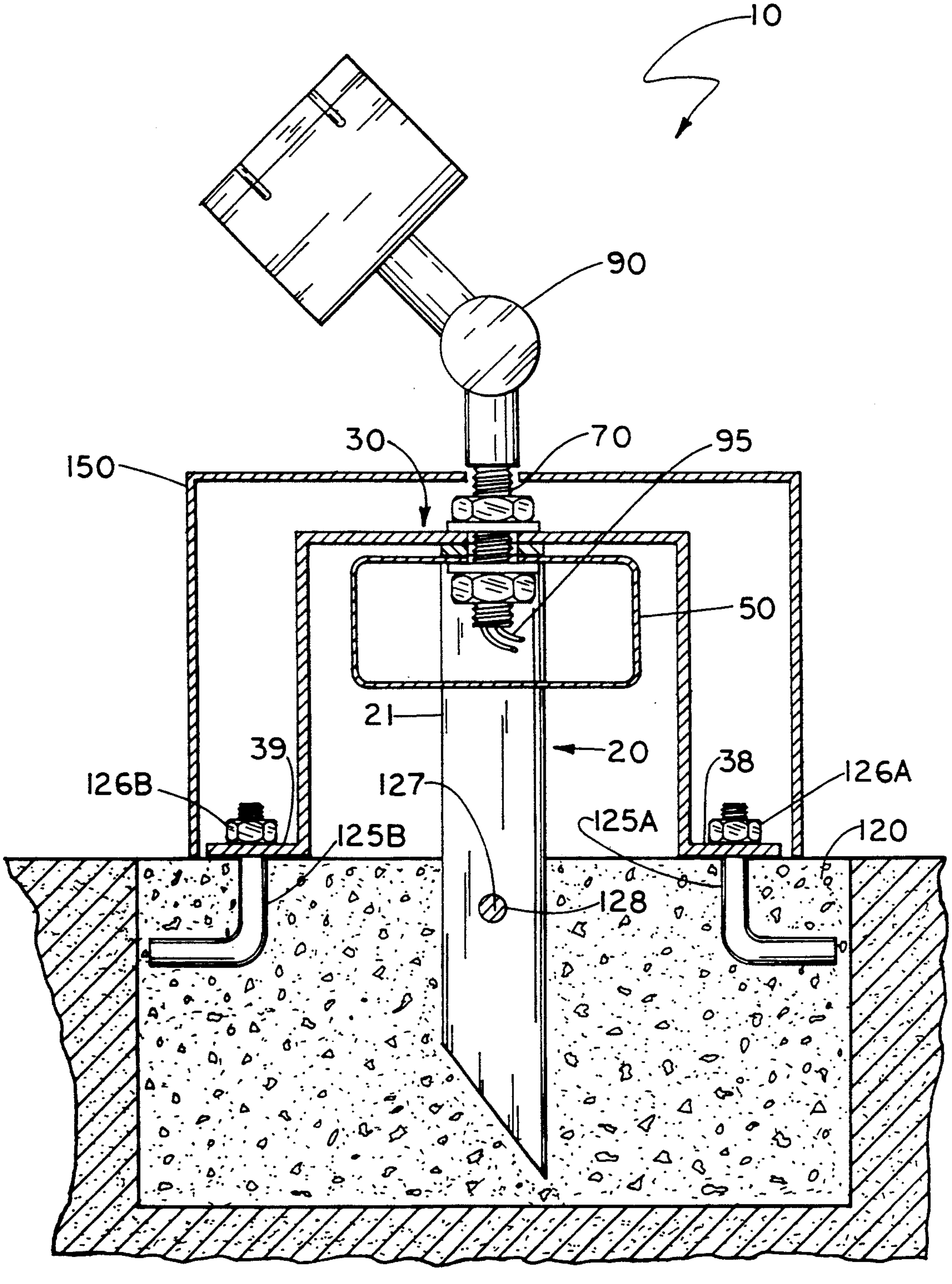
FIG. 3 is a cross-sectional pictorial view of the preferred embodiment of the present invention, with a lighting fixture attached thereto and with the spiked section permanently secured.

FIG. 3 is a cross-sectional pictorial view of the preferred embodiment of the system 10, with a lighting fixture 90 attached thereto and with the system 10 permanently secured in a block of concrete 120. The system 10 receives the lighting fixture 90 by mating attachment of the lighting fixture 90 with the threaded pipe 70. The electrical wires 95 of the lighting fixture 90 are threaded through the interior of the threaded pipe 70 for connection with the wires 95 of the electrical junction box 50.

FIG. 3 also illustrates the system 10 permanently secured in a block of concrete 120. When the system 10 is permanently secured in a block of concrete 120, the foot sections 38, 39 each include a foundation bolt ***125a*, *125b* and a foundation nut *126a*, *126b* for securing the footed section 30 in the block of concrete 120. Additionally, a foundation rod 127 is inserted into holes 128 in each of the elongated legs 21, 22 for securing the spiked section 20 in the block of concrete 120. In situations where the system 10 is permanently secured in a block of concrete 120, it is possible to place a security cover 150 over the entire system 10, except for the lighting fixture 90, in order to protect the system 10 from vandalism or other outside intrusions. In addition, a plurality of lighting fixtures 90 may be attached to the system by attaching one central power source to the electrical junction box *50a*, *50b*** and attaching the lighting fixtures to the central power source.

Figure 4:
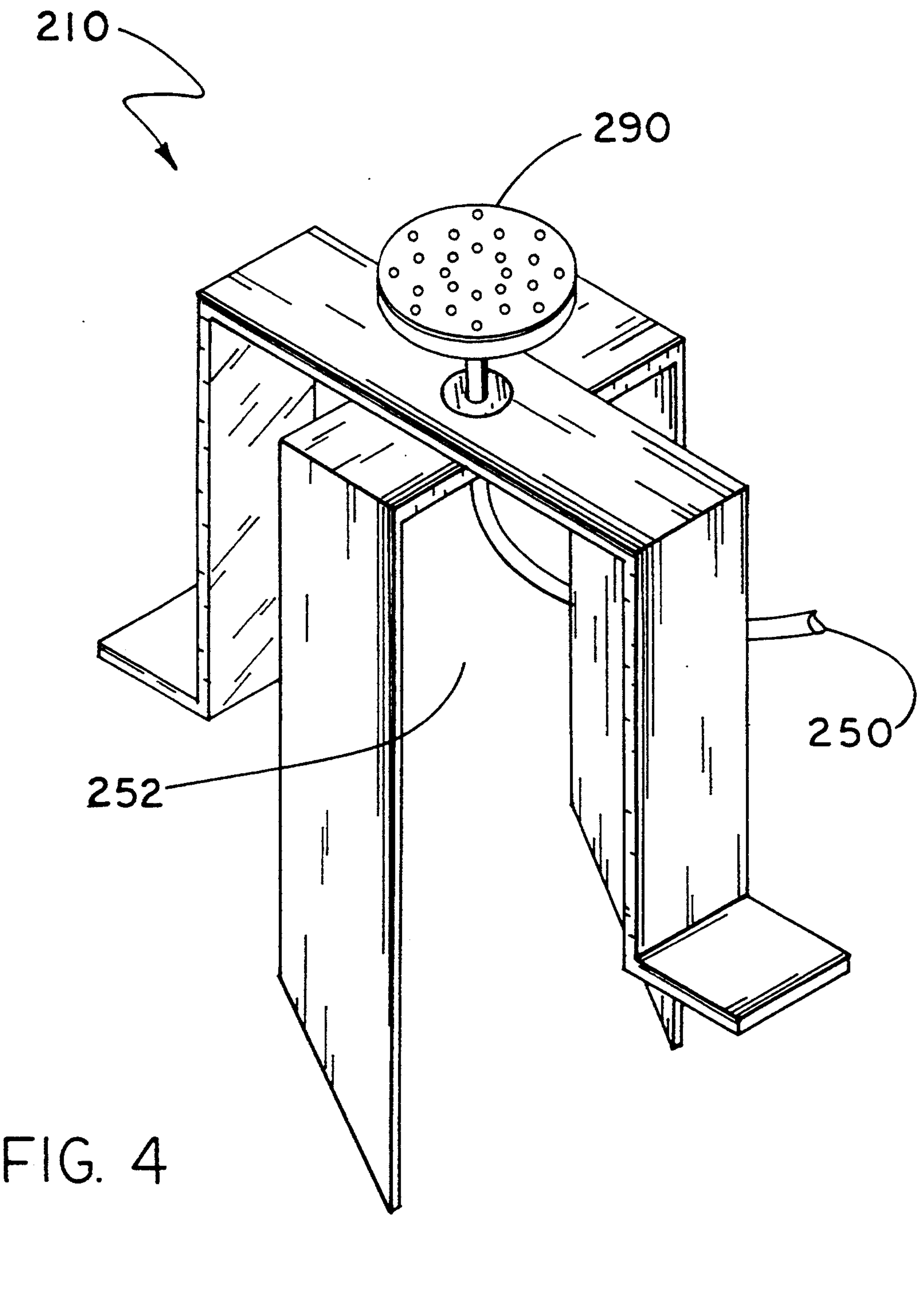
FIG. 4 is a perspective view of an alternative embodiment of the present invention.

FIG. 4 illustrates an alternative embodiment of the stake-based support system 210, in which a water sprinkler 290 is attached to the system 210 and a water supply, such as a water hose 250, is positioned in a sprinkler connection area 252 in order to supply water to the water sprinkler 290.

The stake-based support system 10 may alternatively be employed to support flagpoles or any other devices utilized in the landscaping industry.

Accordingly, it will be understood that both the preferred and alternative embodiments of the present invention have been disclosed by way of example and that other modifications and alterations may occur to those skilled in the art without departing from the scope and spirit of the appended claims.

What is claimed is:

1. A stake-based elevated support system for a landscaping device, comprising:

a connecting source for said landscaping device wherein said connecting source comprises an upper connection section for attachment to said landscaping device and a lower housing enclosing a driving source for said landscaping device;

a substantially U-shaped spiked section comprising a pair of elongated legs linked to each other by a first connecting strip attached to a top end of each of said elongated legs such that said elongated legs are substantially parallel to one another, said elongated legs having a pointed spike at a bottom end opposite said top end for securing said spiked section into a substructure;

a footed section comprising a pair of substantially L-shaped legs linked to each other by a second connecting strip attached to a top end of each of said L-shaped legs, each L-shaped leg comprising a leg portion and a foot portion attached such that said foot portion extends outwardly from said leg portion in a substantially perpendicular direction, said footed section further securing said spiked section in an elevated position to provide an open area above said substructure for housing said lower housing of said connecting source for said landscaping device; and a pipe inserted through a hole in each of said connecting strips, attaching said spiked section to said footed section in a crossed relation with said elongated legs of said spiked section and said L-shaped legs of said footed section extending downward, whereby said pipe defines a passageway through said connecting strips for passage of said upper connection section of said connecting source for said landscaping device, said pipe further comprising a threaded portion at a top end of said pipe for receiving and securing said landscaping device, whereby said landscaping device is threaded into said top end of said pipe, and whereby said upper connection section of said connecting source for said landscaping device extends downward through said passageway into said open area above said substructure.

2. The support system of claim 1, wherein said landscaping device is a lighting fixture.

3. The support system of claim 2 wherein said connecting source is an electrical source for supplying power to said lighting fixture, and wherein said upper connection section comprises at least one wire member, and wherein said lower housing comprises an electrical junction box.

4. The support system of claim 1, further comprising means for permanently securing said spiked section.

5. The support system of claim 1, wherein said landscaping device is a water sprinkler.

6. The support system of claim 5 wherein said connecting source is a water source for supplying water to said water sprinkler, and wherein said upper connection section comprises at least one hose member, and wherein said lower housing comprises a plumbing connection housing.

* * * * *